United States Patent [19]
Combs et al.

[11] Patent Number: 5,909,211
[45] Date of Patent: Jun. 1, 1999

[54] TOUCH PAD OVERLAY DRIVEN COMPUTER SYSTEM

[75] Inventors: James L. Combs, Lexington, Ky.;
Herman Rodriguez, Austin, Tex.;
James A. Strothmann, Indianapolis, Ind.

[73] Assignee: International Business Machines Corporation, Armonk, N.Y.

[21] Appl. No.: 08/823,737

[22] Filed: Mar. 25, 1997

[51] Int. Cl.$^6$ .............................. G08C 21/00; G09G 5/00
[52] U.S. Cl. .................. 345/172; 178/18.01; 178/18.03; 178/18.1
[58] Field of Search ...................................... 345/156, 158, 345/168, 169, 172, 173, 174; 178/18.01, 18.03, 18.07, 18.1; 341/22, 23

[56] References Cited

U.S. PATENT DOCUMENTS

| | | | |
|---|---|---|---|
| 5,574,891 | 11/1996 | Hsu et al. | 345/168 |
| 5,581,243 | 12/1996 | Cluellete et al. | 345/173 |
| 5,610,601 | 3/1997 | Labti et al. | 341/22 |
| 5,666,113 | 9/1997 | Logan | 345/173 |

*Primary Examiner*—Vijay Shankar
*Attorney, Agent, or Firm*—Bernard D. Bogdon

[57] ABSTRACT

A pressure sensitive touch pad and an overlay depicting a pattern, e.g., a typewriter keyboard, for providing specific data characteristics of the pattern to a host computer and to a specific application program of any one of a number of application programs resident in the host computer, which specific application program includes software programmed to accept configured touch pad output signals from the touch pad corresponding to the pattern, which output signals are a function of originally generated touch signals achieved by actuation, normally by touch, of the pressure sensitive overlay surface at any particular point on the pattern, which pattern on the overlay on the touch pad corresponds to and is coordinated with a specific application program in the host computer including a multitude of application programs.

9 Claims, 6 Drawing Sheets

5,909,211

TOUCH PAD OVERLAY DRIVEN COMPUTER SYSTEM

TECHNICAL FIELD

This invention relates generally to input devices for a data processing system. More particularly, it relates to an improved touch pad and overlay for use with a digitizer and an input device for transmission of digitized X/Y coordinates data to a host computer which coordinates are coordinated with a specific host computer application program responsive to the translated coordinate data.

BACKGROUND

The use of a touch input device disposed over the viewing surface of a computer display to provide a "user friendly" means for the control of a data processing system is well known in the art. These devices are designed to allow an unsophisticated user to perform desired tasks on a computer system without extensive training. Human factor studies have shown that an input device which allows the user to input data directly on a computer display, generally known in the art as a touch input device, achieves the greatest immediacy and accuracy between a human and a machine. Most computer system software providing for user interaction is designed primarily for user input in the form of keystroke data. A growing body of software, especially that designed for desktop systems, accepts input from input devices which are typically actuated by touch to a tablet. These devices are particularly well suited for character input.

One such touch input device uses a frame which fits around the display screen having a number of infrared or visible light transmitters and receptors arranged in parallel horizontal and vertical directions. When the users finger blocks the light beams, the horizontal and vertical receptors note the absence of the signals, thereby locating the position of the action desired by the user.

Another class of known touch input devices use transparent overlays placed over the display screen. These touch overlays use a variety of means of detecting the presence and location of either a stylus or finger on or near the display surface.

Some such touch overlays use capacitive or resistive means in the transparent overlay and associated electronics, to detect the input of a user by finger touch. This type of input device can detect the location of a finger touch by the change in capacitance or impedance of the overlay. Yet other touch overlays use a stylus for user input, either to change the capacitance or impedance at the touched location on the touch screen or to return the electromagnetic or electrostatic signals generated by the overlay to a microprocessor to determine the stylus position. Digitizing apparatus is often used for achieving these functions.

It would be advantageous to the user, and simplify the apparatus, if any one of a multiplicity of overlays, each depicting or emulating a different but a familiar user touch pad interface or pattern, could be coded for specific use with any one of a myriad of programs and routines accessible to the programs

SUMMARY OF THE INVENTION

The present invention provides a variable and dynamic user interface device that is intelligent and can detect the presence of an overlay on a digitizer pad. The interface device can change the digitized signals and configure them to a selected overlay and a unique emulation or pattern on the overlay. Under normal circumstances a digitizer outputs absolute X/Y device information to the host. The device can direct those characteristics depending on the overlay installed. Exemplary overlays include keyboard, phone, remote control, calculator, geographical layout, game board layout or other familiar user interfaces whether they be depicted in the form of a pattern, diagram or otherwise presented. If, for example, the keyboard overlay is installed, the input interface device sends keystroke data to a specific program or programs of the host computer identified to the X/Y coordinates. If the overlay were a phone layout, the device would send key closures corresponding to a number pad and custom phone buttons. The overlay is readily changeable and this system is ideally suited for games involving rapid touch actuations and quiz games. A remote control overlay would be configured to send signals operational with some other device such as a TV, CD player, stereo or other appliance.

This could be extended to include a generic notebook computer or general purpose hand held controller. Through use of known overlays, a single interface device functions as several different devices without the application software or its routines knowing or having a need to know what kind of device is being utilized for user input.

BRIEF DESCRIPTION OF THE DRAWINGS:

The invention is pointed out with particularity in the appended claims. The stated advantages of the invention may be better understood by referring to the following detailed description in conjunction with the drawings in which:

DETAILED DESCRIPTION OF THE INVENTION

Figure 1:
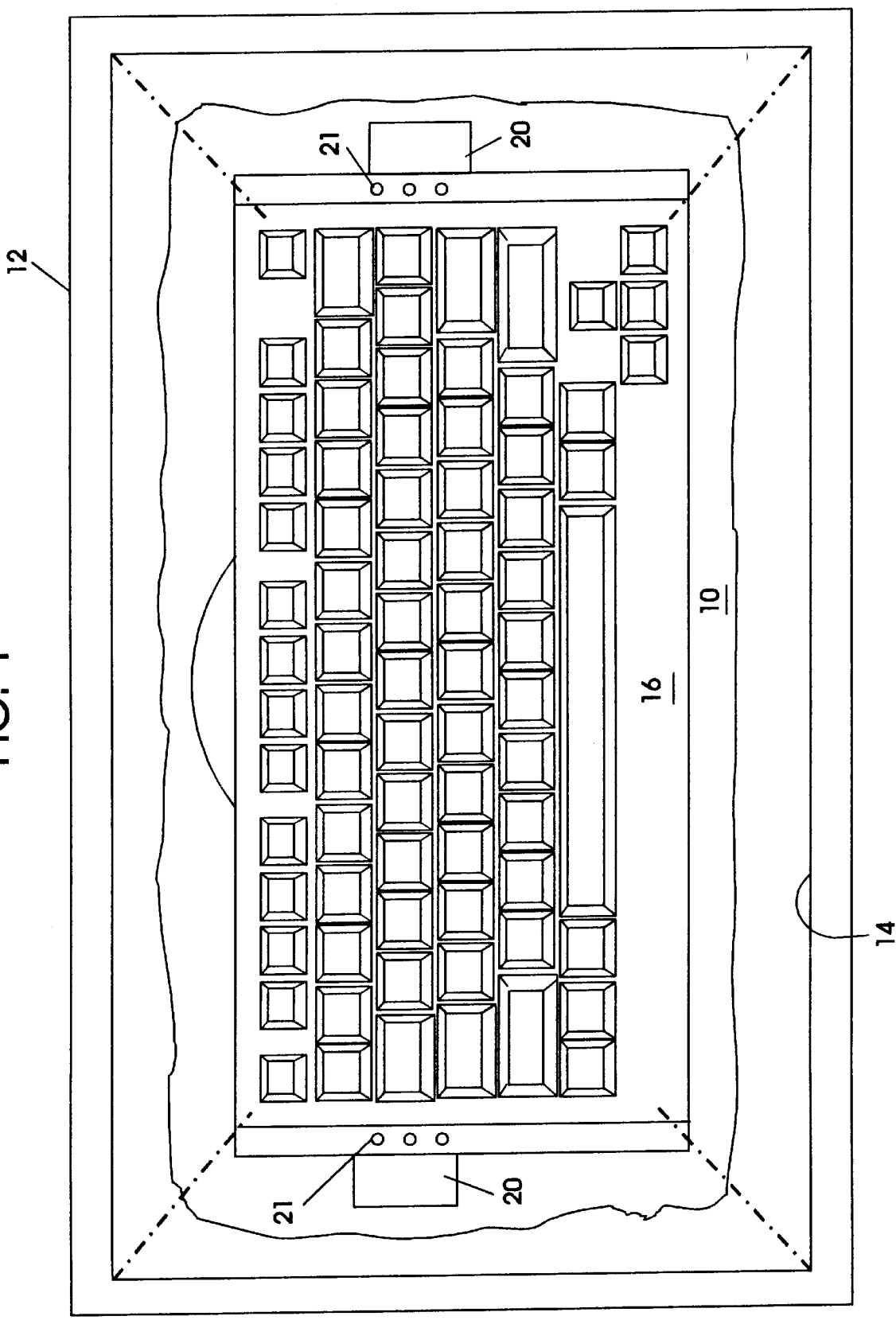
FIG. 1 is a plan view of a touch overlay housing, in exploded view, incorporating an exemplary keyboard overlay, illustrated in part with a touch workpad.

In FIG. 1 there is illustrated, in exploded view, a touch pad housing 12 affixed to a touch workpad 10, shown in a broken away manner and in part only. The housing 12 forms a rectangular shaped recessed window 14 within which is housed a touch overlay 16 or template. The touch overlay 16 can be one of the myriad of configurations, diagrams or patterns designed to emulate input devices, including, but not limited to, a keyboard, a phone keypad, a calculator, a remote control device and any other similar input station. For illustration purposes only, the touch overlay 16 in FIG. 1 is a keyboard. The touch workpad 10, dependent on the touch overlay 16 installed and registered to the housing 12, is responsive to directed signals sent as a result of touch stimulation of a selected key or character or area of the overlay, and functions with a computer system to act as an input in compliance with the selected overlay.

The overlay or template 16 is generally transparent, excepting, for example, for an outline of the input device depicted on the overlay. However, the overlay 16 can be coded with opaque sectors or areas of the overlay in such a way that when the overlay is installed in the touch pad housing 12, the coded portions, whether transparent or opaque or some other degree of transparency, are aligned with sensor, scanner or detector interface devices 20. Devices 20 are shown in FIG. 4 as exemplary and schematically and only on one side of an overlay, but in fact are positioned to be in alignment with exemplary apertures 21 of FIGS. 1, 2 and 3, which devices 20 preferably optically read the overlay and send signals which identify the overlay to the system software. The apertures 21 could be juxtaposed to the sensors 20 in any of a myriad of patterns disposed in selected areas of the overlay 16. In the alternative, the overlay 16 could have other indicia, including bar codes, at similar locations as those apertures 21 shown in FIG. 1, or cutouts incorporated along the boundary edge or edges of the overlay which cutouts or indicia represent, e.g., a six bit binary code. The binary code may contain a first part which contains emulation information and a second part which contain an overlay number code which the system software is able to use for special functions. See Tables V and VI for more specifics of the binary codes transmitted. Therefore it is appreciated that a variety of coding, either magnetic, optical or physical may be sensed by mode or identification sensors. The overlay 16 is interchangeable and preferably generally flexible and consists of a suitable durable plastic material.

As presented the edges, or other suitable aspects of the overlay 16 contain transparent or opaque apertures or sectors, such as circles, that in combination define a binary code which represents the unique overlay 16. Any overlay not identifiable by the interface device 20 passes the binary code on through interface 64 of FIG. 5 to the host computer and CPU 74 for local identification. Translation, once identified, could then occur for the application-specific overlay. The input device 20 could also detect the change of overlays and send a signal to the host device to launch or terminate the application required by the overlay. For example, the calculator overlay, when installed would launch the calculator program. Likewise, if the overlay were a scientific calculator, the calculator would run in the scientific mode. Also, simply, any application program could be terminated by removing the overlay from the input device or workpad 10.

Figure 2:
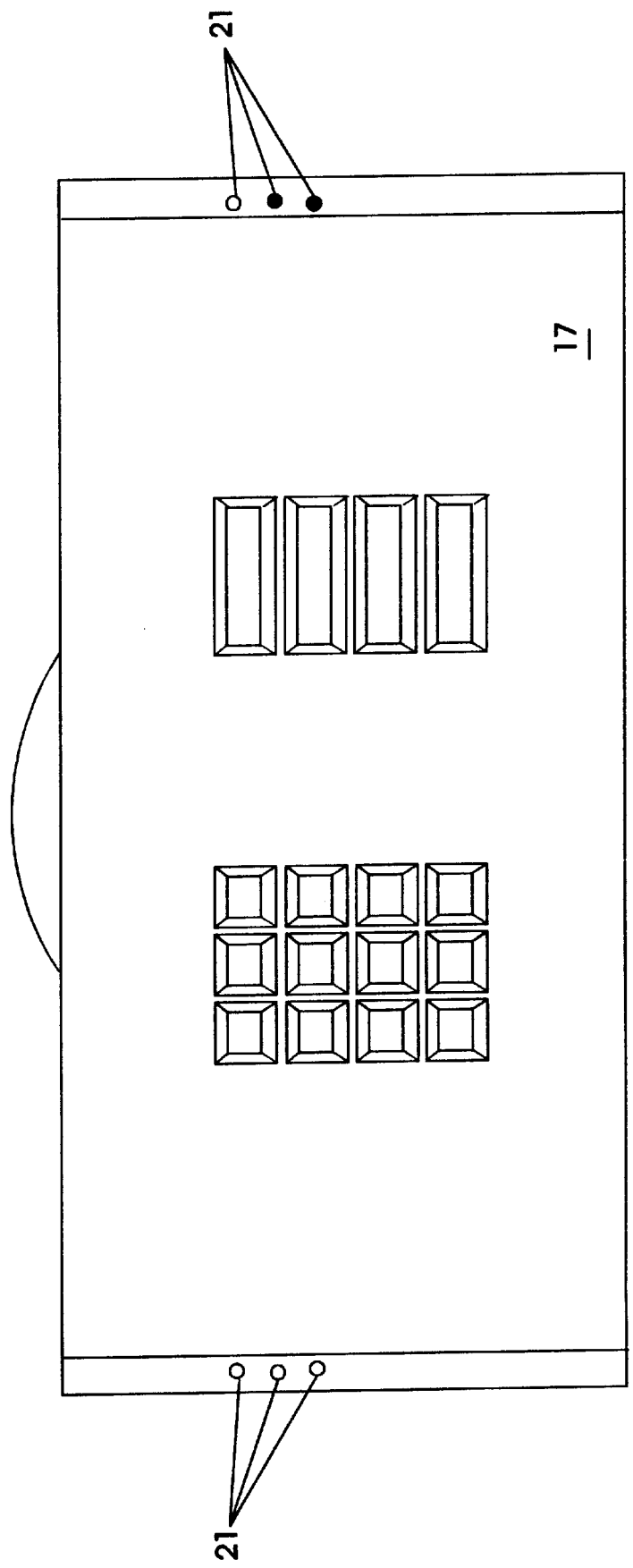
FIG. 2 is a plan view of an exemplary phone pad overlay.
Figure 3:
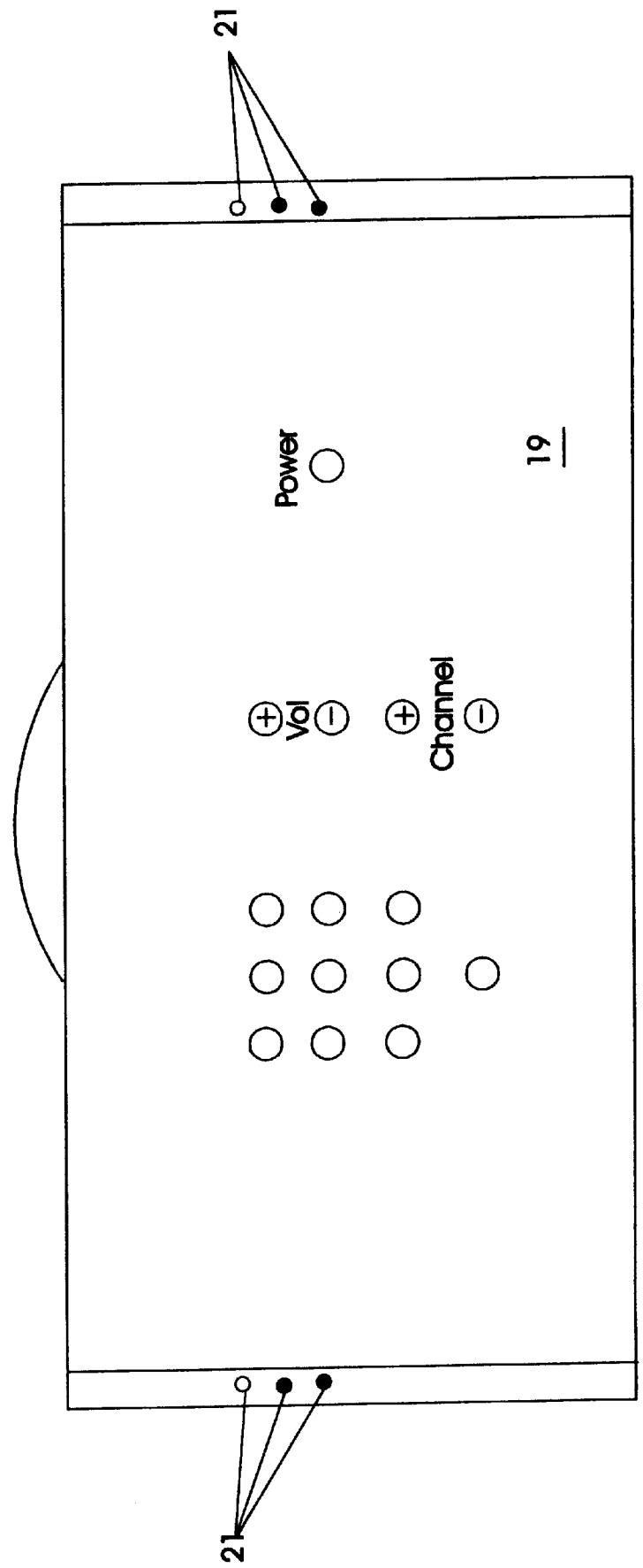
FIG. 3 is a plan view of an exemplary remote control overlay.
Figure 4:
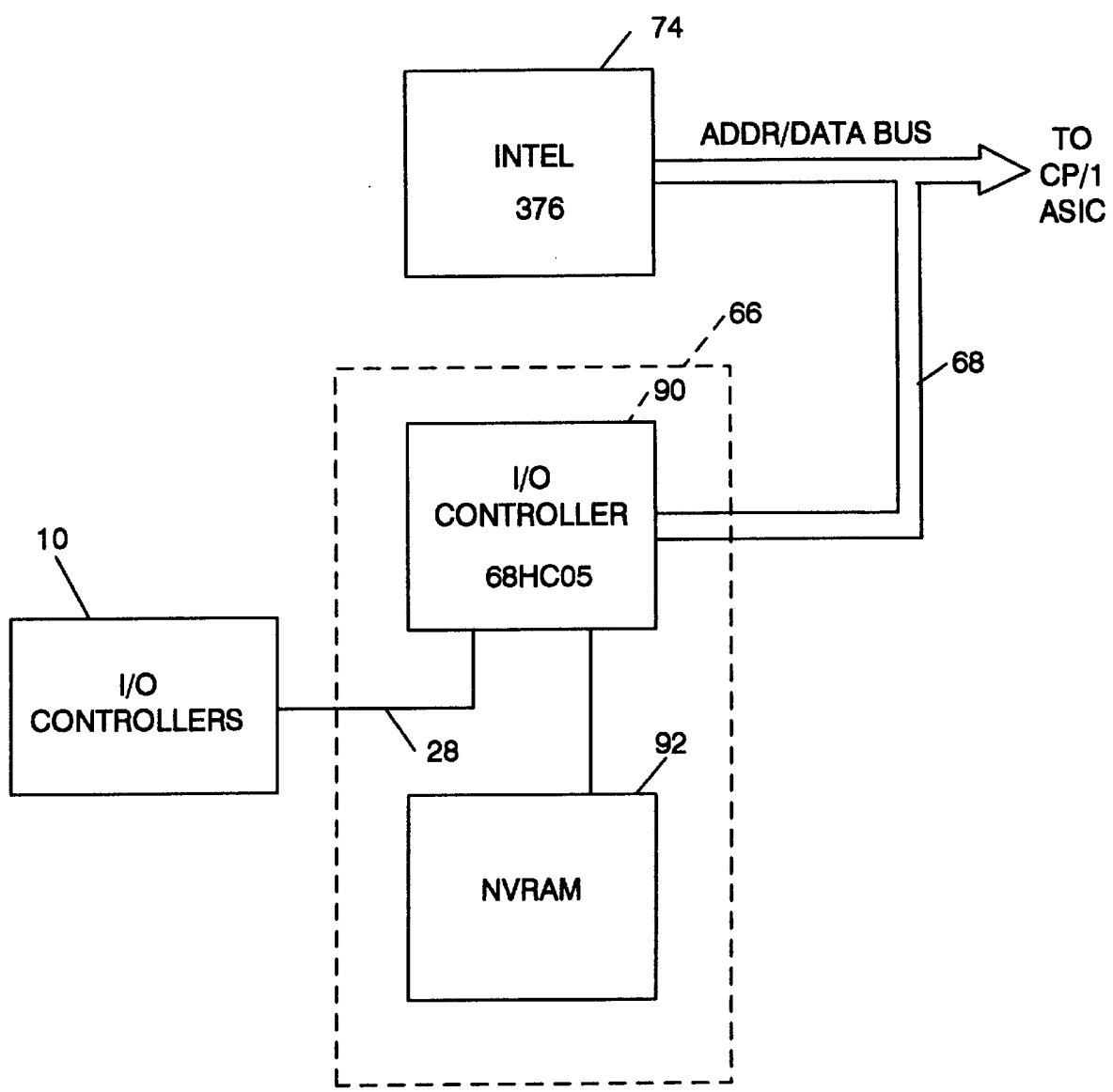
FIG. 4 is a schematic block diagram of a system for detecting and processing I/O device signals.

FIGS. 2 and 3, respectively, depict overlays 17 and 19 which illustrate, for example, for overlay 17, a phone keypad, and for overlay 19, a remote control pad.

Figure 5:
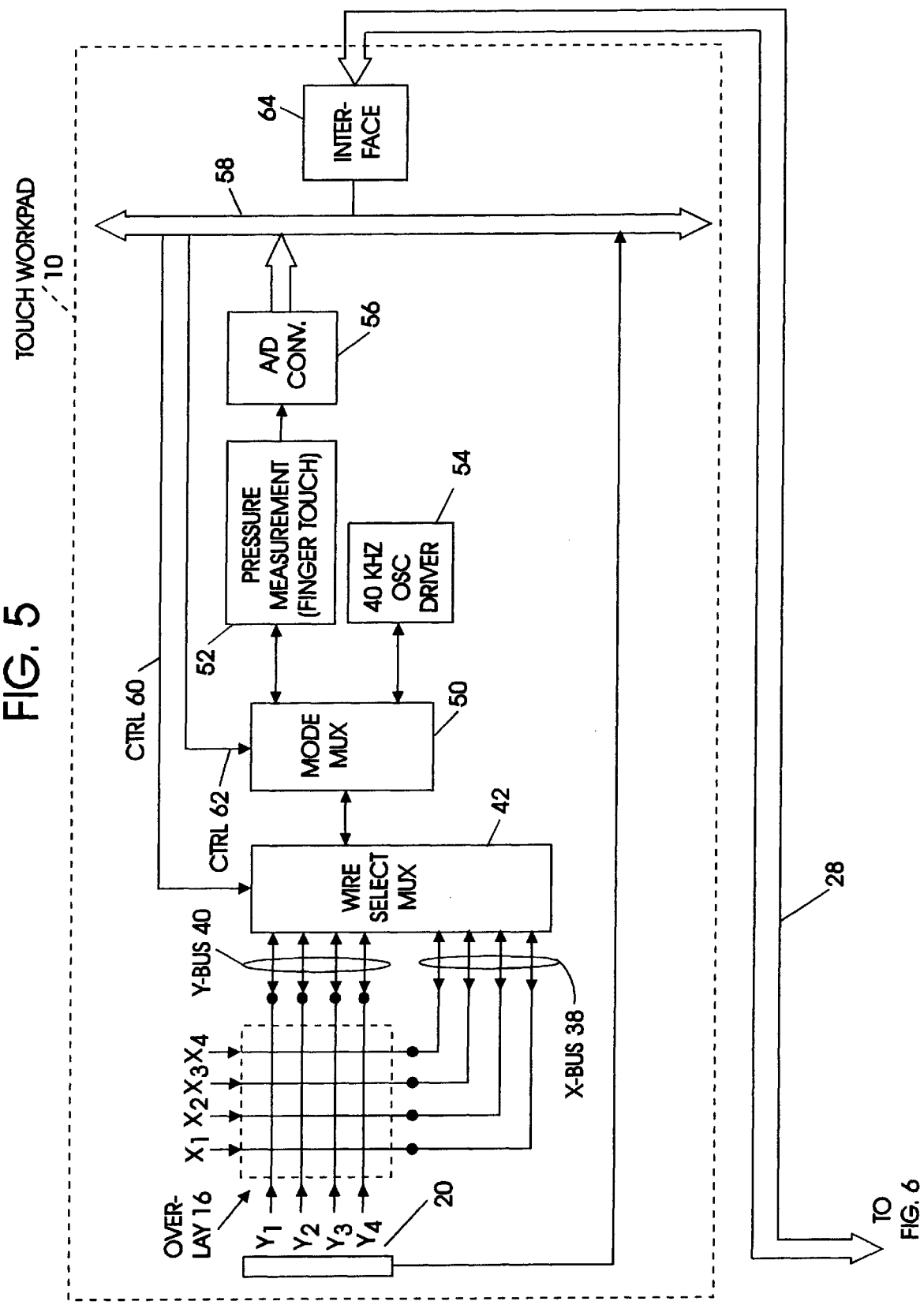
FIG. 5 is a schematic diagram for a touch workpad and detection system.

Referring more specifically to FIG. 5, a touch workpad 10, is shown. The workpad 10 and its assembly comprises the housing 12 having the rectangular recessed window 14 which surrounds the edges of the exemplary rectangular touch overlay 16. The sensors/detectors 20, for example, optically detect and produce sensor signals as a function of the coding read from the selected overlay 16. These sensor signals accordingly identify and pass through interface 64 information of a recognized overlay layout, which is provided to a PC interface 66 of FIG. 6 and with the necessary intelligence and logic to correspond the information of digitized signals with a program or application 82 operational in the personal computer of FIG. 6.

A wired stylus, not illustrated but of a general and well known configuration, is attached to the touch pad 10 with a switch mounted on the side. The switch is wire Ored with a center button of the touch pad and is used to allow the operator to change the operating mode of the stylus. Since the stylus requires pressure for detection, the button is used to provide a trail for the stylus tip as it travels on the touch pad.

The touch pad 10, as previously described, contains sensors/detectors 20, typically six, to detect the presence of an overlay. A finger of a user acts as a stylus to touch areas on the overlay for certain applications. The touch pad 10, in one preferred embodiment, contains five buttons, with three located at the bottom area of the touch pad controller and one each on, optional, joystick knobs.

Figure 6:
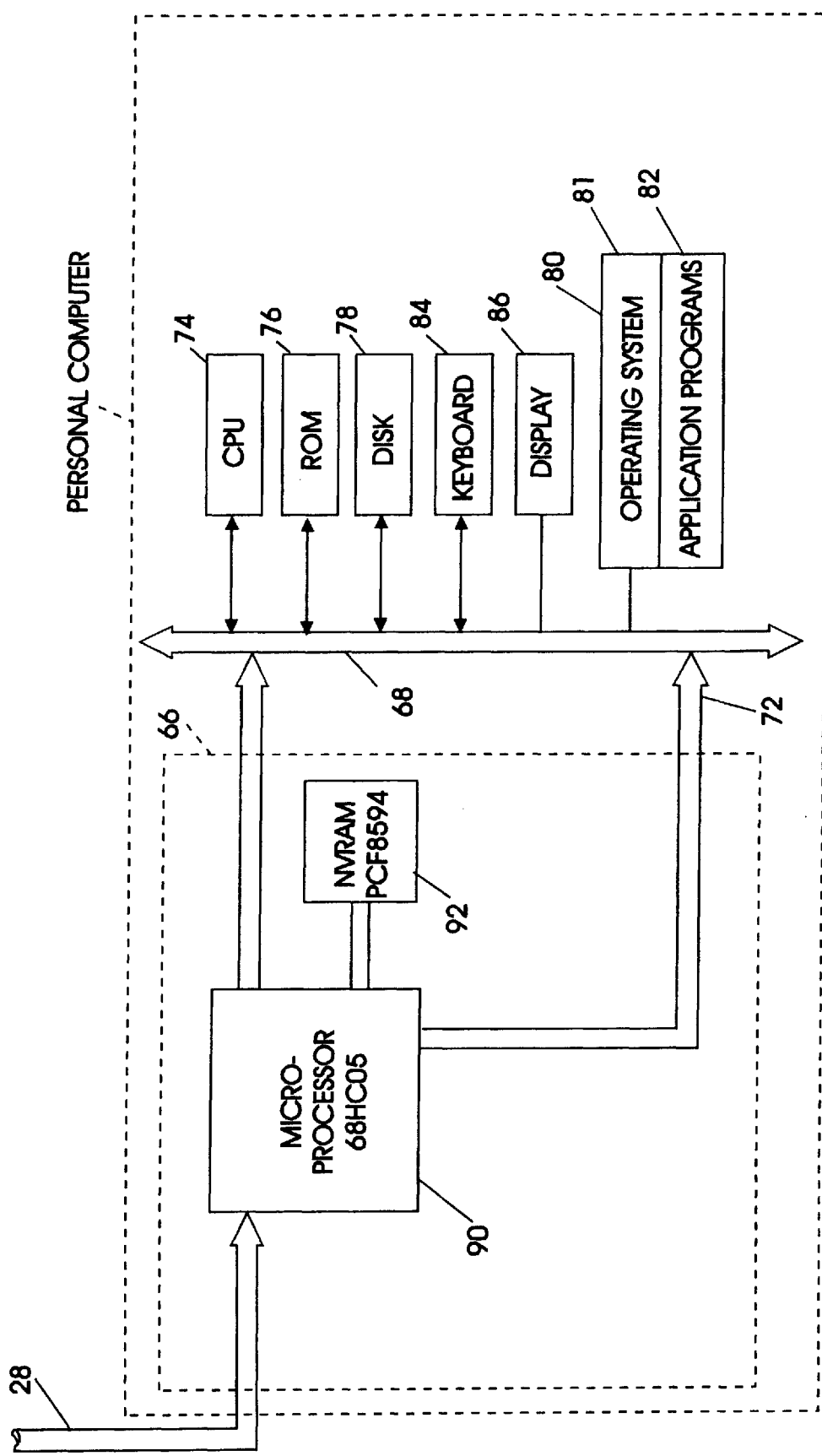
FIG. 6 is a schematic diagram of a touch pad interface module and an exemplary computer system.

Workpad cable 28 is the connecting link between the workpad 10 and the computer system of FIG. 6 with which the user is communicating. The workpad cable 28 provides power to the workpad 10 as well as to energize, for operation, the pressure sensitive X-Y coordinate array disposed below or as a part of the overlay 16 and to transmit touch signals to operate the overlay in finger touch.

As discussed in connection with FIG. 5, the touch workpad 10 communicates with the personal computer of FIG. 6 via cable 28. Vertical X (X1, X2, X3, X4, . . . Xn) and horizontal Y (Y1, Y2, Y3, Y4, . . . Yn) conductors cover the entirety of the surface over which the overlay is disposed. This provides for the generation of signals even from areas on each overlay which are outside of the depicted outline for the selected input device and its configuration, such as a keyboard array of keys, illustrated in FIG. 1. The vertical X conductors are connected through the X bus 38 and the horizontal Y conductors are connected through the Y bus 40 to the wire selection multiplexer 42, respectively.

The touch pad 10 is a pressure sensitive array of horizontal and vertical lines. The considered horizontal resolution is, for example, 256 lines and the vertical resolution is, for example, 200 lines. Output of the touch pad 10 is an analog voltage for each of the axis. The top left corner of the touch pad is location 0.0. The bottom left is, for example, location 0.199. The top right location is, for example, location 255.0. The bottom right location is, for example, location 255.199.

The wire selection multiplexer 42 is connected through the mode multiplexer 50 to the pressure sensitive measurement device 52 which is used for finger touch detection. The wire selection multiplexer 42 can also be connected through the mode multiplexer 50 to the oscillator driver 54 and can be used to drive the X bus 38 and the Y bus 40 for other detection operations. For certain applications, such as selecting items from a list, finger sensing methods have been found more convenient.

The output of the capacitance measurement device 52 is connected through the analog-to-digital converter 56 to the workpad bus 58. The workpad bus 58 is connected via workpad interface 64 to the cable 28 which connects to a PC interface 66 in the personal computer of FIG. 6. The PC interface 66 communicates to the main system bus 68. If an overlay 16 is not known to the interface 64, it passes the transmitted identifying binary code to the host computer for local identification. The interface 64 can also detect a change in overlays and sends a signal to terminate the current application or launch the application required by the overlay, e.g., a calculator overlay launches the calculator program. Also, the application program of element 82 can be terminated by the removal of an overlay 16 from the touch pad housing 12.

The system, in its illustrated embodiment, uses a Motorola 68HC705CB input-micro controller 90, or equivalent, to transfer messages from the input devices, e.g., touch pad 10, to the system processor 74 and to perform other system functions. A system input controller (SIC) 90 is located in the I/O space and is accessible at the addresses decoded and defined by a general purpose input/output (GPI0) 1 of a control program (CP) 1 application specific integrated circuit (ASIC). All I/O transfers to and from the SIC 90 are 8 bits. The system functions the system input controller 90 performs include a system reset, where a power-on reset resets the SIC 90 which resets the CP/1.

Input data from I/O controllers will be sent to the system of FIG. 6 via an asynchronous serial data message which consists of the device type, the device number, and input data. The input device data messages will be received and decoded by the SIC 90.

The personal computer includes standard devices such as a CPU 74, ROM 76, disk storage 78, a memory 80 which stores operating system 81 and exemplary application programs 82, keyboard 84 and standard display 86, as schematically illustrated in FIG. 6. Each respective application program of the myriad of application programs in the applications box 82 can, in accordance with the principles of this invention, be operational and functional directly from the output signals of the work pad 12 which are configured to each respective and specific application program or a series of programs corresponding or coded to a specific overlay pattern or patterns. In each case the coding for a particular coordinate location is not hard coded or fixed to a particular meaning. The coding for each overlay is known to the application running at the time, or to another identifiable application, and each application uses a particular code as necessary for its own use. All of the work pad 12 or digitizer data is passed to the identified application regardless of what overlay code current overlaid on the work pad 12. In this manner the software can relate to routines within the application or elsewhere which relate to the specific overlay. Although the CPU 74 can be a 376, preferably it has been modified to start and run in 32 bit mode. Joysticks or other pointing type devices are also optionally installed. Any standard display 86 is typically a CRT.

The wire selection multiplexer 42 and the mode multiplexer 50 connect selected patterns of a plurality of the horizontal and vertical conductors from the overlay 16 to either the capacitance measurement device 52 or the 40 kilohertz oscillator driver 54, in response to control signals applied over the control inputs 60 and 62 from the bus 58 by a control processor of the PC interface 66. During finger touch operations, the capacitance measuring device 52 has its input coupled through the mode multiplexer 50 and the wire selection multiplexer 42 to selected single conductors in the horizontal and vertical conductor array in the overlay 16 in response to control signals from the PC interface 66. The output of the pressure measurement device 52 is converted to digital values by the AID converter 56 and is supplied over the bus 58 to the PC interface 66. The PC interface 66 executes a sequence of stored program instructions to detect the horizontal array conductor pair and the vertical array conductor pair disposed below the overlay 16 at the location being touched by the operator's finger and coordinated with the applicable program in box 82 in correspondence to the overlay 16.

Regarding transfers from the SIC 90 to the system, where the BIOS presents the data to software via software interrupts, when an input controller has data or a message for the system processor 74, the SIC 90, will signal the processor 74 by pulling A10 pin low on the CP/1. The CP/1 will then trigger the IRQ of an exemplary 376 CPU-processor 74. During the Interrupt Acknowledge Cycle of a 376 processor the CP/1 will place on the processor bus 68 the address of the Interrupt routine responding to Analog Interrupt 0 (AI0).

The sequence to respond to an interrupt generated by the SIC 90 starts with SIC 90 providing a single byte indicating the number of timer ticks since the last interrupt service and the number of the IO device messages to be transferred. The format of the first byte is as illustrated in Table I, below:

TABLE 1

| Bits 7-4 | Bits 3-0 |
|---|---|
| Number of IO Device Messages (0–15) | Number of timer ticks since last service (0–15) |

Additional data is transferred based on the number of IO device messages. A transfer sequence from the SIC 90 to the system is, for example, as illustrated in Table II, as follows:

TABLE II

| Byte # | Value (Hex) | Description |
|---|---|---|
| 0 | 21 | 2 IO device messages, 1 timer tick since last service |
| 1 | 02 | 2 bytes for first IO device message |
| 2 | 12 | Byte #1: Message identifier (joystick #1) |
| 3 | 80 | Byte #2 Joystick position information (Up position) |
| 4 | 04 | 4 bytes for second IO device message |
| 5 | 04 | Byte #1: Message identifier (Coordinate/Touchpad #0) |
| 6 | 01 | Byte #2: Button 0 depressed |
| 7 | 64 | Byte #3: X Coordinate (64) |
| 8 | 32 | Byte #4: Y Coordinate (32) |

If the timer is disabled, the timer tick value will be 0. Any additional IO device messages received during the transfer of the current information will be sent on to the next interrupt sequence. Interrupts occur on 50 mS internals.

Once a message has started, no more than 3 milli-seconds between successive bytes is preferably allowed. If this time is exceeded, the entire message is considered invalid and must be discarded. The 3 mS time is from the end of the stop bit to the beginning of the next start bit. This prevents system lock-up in the event of an IO controller malfunction or cable problem. The 3 mS time is 1.5 times the nominal time to transfer one byte of information over the serial bus.

The following Table III describes the IO device message transferred by the SIC 90 to the system BIOS for the touch pad overlay on touch pad 10. This information is passed to the application software 82 via a software interrupt through control of the CPU 74.

TABLE III

| Device Type | Byte 0 Count | Byte 1 (bits 4–7) | (Device ID) (Bits 0–3) | Byte 2 | Byte 3 | Byte 4 |
|---|---|---|---|---|---|---|
| Touchpad Overlay Message | 2 | Device Number in Chain | 5 | Overlay Code (0–63) | N/A | N/A |

The following Table IV describes SIC 90 Output messages, including the message type, structure, and data to be transferred to the SIC 90 by the 376 processor 74.

TABLE IV

|  | Byte 0 | | |
| --- | --- | --- | --- |
| System Message | High Nibble | Low Nibble | Byte 1 |
| Timer Interrupt Enable | F = Disable 0 = Enable | 0 | N/A |
| NV-Memory Address | Segment # | 1 | Address (0–255) |
| NV-Memory Write | 0 | 2 | Data written to NVRAM |
| NV-Memory Read | 0 | 3 | Data read from NVRAM |
| PS/2 Output | 0 | 4 | Output Data (PS/2) |
| Serial Output | 0 | 5 | Output Data (Serial) |
| System Reset | F | F | N/A |

Notes: 1. Segment number is 0 or 1; and
2. The address of NVRAM will automatically be incremented after each NVRAM read or write. (For example, a 5 byte read of NVRAM data can be accomplished by doing an address cycle followed by 5 NVRAM read cycles.)

The SIC 90 will also be responsible for providing the Inter-Integrated Circuit (I$^2$C) serial interface or synchronous two-wire bus to the system processor 74. The first byte sent to the SIC 90 will be of Message Type 1. The upper nibble, or half byte, of write/read messages to the SIC 90 will contain the segment number for the memory NVRAM 92, as illustrated in FIG. 6. The default NVRAM for the system is 512 bytes long so the current design will only allow values 0, and 1 in the upper nibble. A 0 indicates the address field will be a byte in the range 0–255. Whereas a 1 in the upper nibble indicates the address written is in the range 256–511. The next byte sent to the SIC 90 is an 8 bit address for the NVRAM 92 read/write cycle. This address is the byte in the 256 byte segment that the data will be read from or written to the memory 92.

Additional commands can be sent (Message Type 2 & 3) to write and read the NVRAM 92. After each Write or Read cycle, the SIC 90 will automatically increment the address for the next NVRAM 92 write or read cycle. A new address command (Message Type 1) can be sent at any time to load a new address to the SIC 90.

The HC05 controller of SIC 90 keeps the system processor 74 on hold, READY=1, while processing any NVRAM 92 operation. The NVRAM 92 operations will slow the system down and, but for the data types to be stored, this will not result in unreasonable or unsatisfactory operation.

There can be a multitude of input messages to the system of FIG. 6 generated by external input control devices. The first byte is a byte count. The second byte is a Device ID. The Device ID contains two parts. The high nibble is a Device Number of the IO chain and the low nibble is the identifier for the device. Additional bytes may or may not be sent depending on the device type. A checksum is always the last byte. Device messages use the following format, as illustrated in Table V.

TABLE V

| Byte Count n | ID (#/Type) | Byte 0 | ... | Byte n–1 | Checksum |
| --- | --- | --- | --- | --- | --- |

The checksum is a value which forces the sum of the entire message packet to be zero when all bytes of the message are added using an 8 bit checksum and ignoring any carry. Messages are only sent when a change from a previously reported state has occurred. This keeps message transmissions to a minimum. Below in Table VI is a typical example of a message packet for the touch pad.

TABLE VI

| Byte # | Value (Hex) | Description |
| --- | --- | --- |
| 0 | 03 | Byte Count (3) |
| 1 | 04 | ID: Touchpad Code |
| 2 | 01 | Byte 0: Button Info |
| 3 | 10 | Byte 1: X Coordinate |
| 4 | 20 | Byte 2: Y Coordinate |
| 5 | C8 | Checksum |

There are optionally two digital joysticks, not illustrated, on each touch pad and are supported as Device Type 2. Each joystick has a unique chain number. The left joystick is odd, (1, 3, 5, 7, 9, etc.) and the right joystick is even (0, 2, 4, 6, 8, etc.). Each joystick is reported independently and has a fixed length message. The joysticks in the touch pad only have one button. Any other button is always reported as zero.

The touch pad 10 is supported as a Device Type 4. The first byte following the ID is used to report button information. The next byte is used to report the absolute X position. The absolute Y position is next in sequence. The absolute X and Y values are each 1 byte and are limited to a range of 0–255. This is a fixed length message. The touch pad 10 is an absolute coordinate device and uses the following byte to respond for the buttons, as illustrated in Table VII.

TABLE VII

| Bit 7 | Bit 6 | Bit 5 | Bit 4 | Bit 3 | Bit 2 | Bit 1 | Bit 0 |
| --- | --- | --- | --- | --- | --- | --- | --- |
| 0 | 0 | 0 | 0 | 0 | Right | Center | Left |

Touchpad overlays 16 are reported in the preferred embodiment as Device Type 5. Touchpad overlays 16 are sensed using a 6 bit sensor in the touch pad 10. When an overlay change is sensed by interface 64 of the touch pad 10, a message is generated. All overlay codes are application dependent and the application of application program 82 recognizes the codes of each overlay 16. This message is a fixed length message.

Although the present invention and its advantages have been described in detail, it should be understood that various changes, substitutions and alterations can be made herein without departing from the spirit and scope of the invention as defined by the appended claims.

What is claimed is:

1. A work pad and an overlay with a specific pattern combination adapted to be utilized as input to a data processing system operational under any one of a multitude of application programs for receiving work pad output in the form of pattern signals corresponding to the specific pattern on the overlay, which pattern signals correspond to and are a function of coordinate signals originating from actuation of a pressure sensitive work pad surface, the pattern signals corresponding to a specific application program of the multitude of application programs and registered to the coordinate locations actuated on the work pad, comprising:

the overlay disposed above the work pad, the overlay bearing identification indicia unique to a pattern displayed on the overlay;

the work pad comprising, X and Y coordinate pressure sensitive conductors disposed in a grid array for providing unique location outputs signals corresponding to each different location on the grid array, and sensors for detecting the pattern of the overlay disposed above the grid array of the work pad and for providing a detection signal corresponding to the indicia on the overlay; and the data processing system having the multitude of application programs and including a processor, memory, identification means receiving the detection signal, comparing the detection signal to respective identification data corresponding to each application program of the multitude of application programs utilized in and operational with the data processing system and matching the detection signal with the identification data of a specific application program, and configuration means responsive to the matching of the detection signal with the identification data of said specific application program programmed for generating configuration signals for each unique location work pad output signal in the form of coordinate signals corresponding to the overlay pattern for processing by the matched specific application program.

2. The work pad and the overlay with the specific pattern combination and the data processing system, as defined in claim 1, wherein the detection signal further comprises a two part binary code, wherein the first part contains emulation information characteristic of the pattern of the overlay and the second part contains an overlay number code for use by the software of the corresponding application program.

3. The work pad and the overlay with the specific pattern combination and the data processing system, as defined in claim 1, wherein the pattern on the overlay can be any one of the following: typewriter keyboard, computer keyboard, telephone pad, remote control key pad, calculator, geographical layout and game layout.

4. The work pad and the overlay with the specific pattern combination and the data processing system, as defined in claim 1, wherein the identification indicia on the overlay unique to the pattern displayed on the overlay comprises a series of opaque and optically clear apertures arranged in an order to provide a binary digital signal unique to the pattern when read by the sensors.

5. The work pad and the overlay with the specific pattern combination and the data processing system, as defined in claim 1, wherein the sensors for detecting the pattern of the overlay are optical sensors which provide detection signals as a function of the opacity of the identification indicia on the overlay.

6. The work pad and the overlay with the specific pattern combination and the data processing system, as defined in claim 1, wherein the configuration means includes programming to configure the location output signals to the programming of the respective application program to which the overlay pattern corresponds.

7. The work pad and the overlay with the specific pattern combination and the data processing system, as defined in claim 1, wherein the processor is operative in a 32 bit mode.

8. The work pad and the overlay with the specific pattern combination and the data processing system, as defined in claim 1, wherein the X and Y coordinate pressure sensitive conductors disposed in a grid array are disposed beyond the periphery of the pattern on the overlay for providing unique location outputs signals corresponding to each different location on the grid array within the boundary of the periphery of the pattern on the overlay and beyond the boundary of the periphery of the pattern on the overlay.

9. A work pad and an overlay with a specific pattern combination adapted to be utilized as input to a data processing system operational under any one of a multitude of application programs for receiving work pad output in the form of pattern signals corresponding to the specific pattern on the overlay, which pattern signals correspond to and are a function of coordinate signals originating from actuation of a pressure sensitive work pad surface, the pattern signals corresponding to a specific application program of the multitude of application programs and registered to the coordinate locations actuated on the work pad, comprising:

the overlay disposed above the work pad, the overlay being flexible and bearing identification indicia including a combination of opaque and non-opaque apertures disposed about the periphery of the overlay, which indicia is unique to identification of a pattern of any of a typewriter keyboard, computer keyboard, telephone pad, remote control key pad, calculator, geographical layout and game layout displayed on the overlay;

the work pad comprising, X and Y coordinate pressure sensitive conductors disposed in a grid array disposed beyond the periphery of the pattern on the overlay disposed above the work pad for providing unique location outputs signals corresponding to each different location on the grid array within the boundary of the periphery of the pattern on the overlay and beyond the boundary of the periphery of the pattern on the overlay, and sensors for detecting the pattern of the overlay disposed above the grid array of the work pad and for providing a detection signal as a function of the opacity of the apertures on the overlay corresponding to the indicia on the overlay comprising a two part binary code, wherein the first part contains emulation information characteristic of the pattern of the overlay and the second part contains an overlay number code for use by the software of the corresponding application program; and the data processing system having the multitude of application programs and including a processor operative in 32 bit mode, memory, identification means receiving the detection signal, comparing the detection signal to respective identification data corresponding to each application program of the multitude of application programs utilized in and operational with the data processing system and matching the detection signal with the identification data of a specific application program, and configuration means responsive to the matching of the detection signal with the identification data of said specific application program programmed for generating configuration signals for each unique location work pad output signal in the form of coordinate signals corresponding to the each location within and to locations outside of the periphery of the overlay pattern for processing by the matched specific application program.

* * * * *